March 30, 1926.
J. S. WEARN
1,578,785
POWER TRANSMISSION MECHANISM FOR CREAM SEPARATORS AND OTHER MACHINES
Filed May 9, 1924
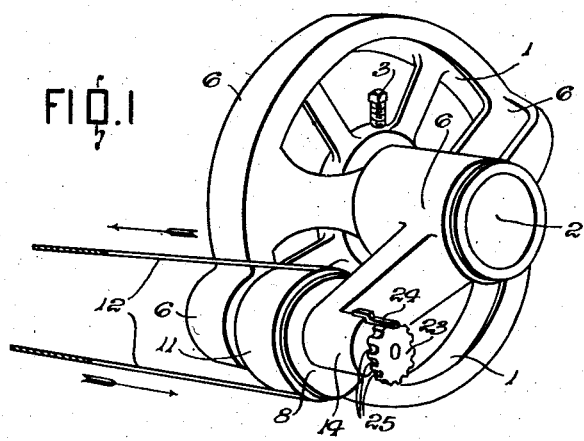
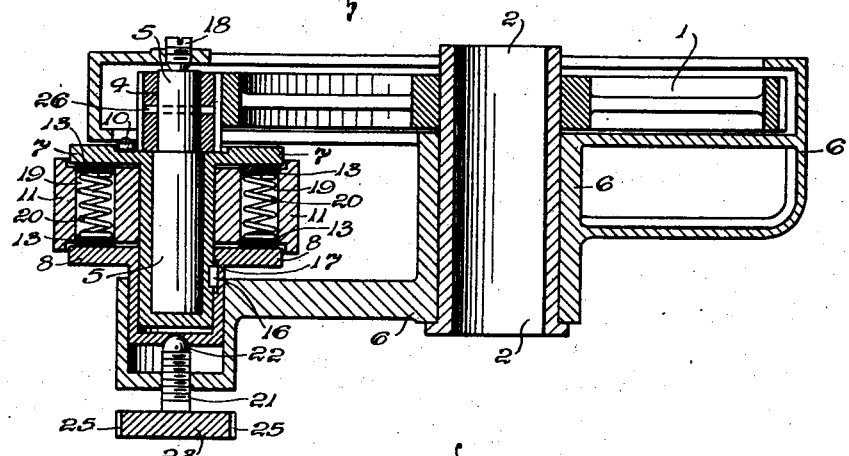
INVENTOR:
JAMES STUART WEARN
BY: Francis E. Boyes
ATTORNEY.

Patented Mar. 30, 1926.

1,578,785

UNITED STATES PATENT OFFICE.

JAMES STUART WEARN, OF CHRISTCHURCH, NEW ZEALAND, ASSIGNOR TO WEARN$ AUTOMATIC DRIVE COMPANY, LIMITED, OF CHRISTCHURCH, NEW ZEALAND, AN INCORPORATED COMPANY OF NEW ZEALAND

POWER-TRANSMISSION MECHANISM FOR CREAM SEPARATORS AND OTHER MACHINES.

Application filed May 9, 1924. Serial No. 711,958.

*To all whom it may concern:*

Be it known that I, JAMES STUART WEARN, a subject of the King of Great Britain, residing at 66 Bishop Street, Christchurch, in the Dominion of New Zealand, have invented new and useful Improvements in Power-Transmission Mechanism for Cream Separators and Other Machines, of which the following is a specification.

This invention relates to belt-driven appliances for use in transmitting motive power to cream-separators and other machines at the correct operating speed of such machines and refers to that type of appliance shown in Patent No. 1,526,650, granted to me under date of February 17, 1925, which appliance comprises a belt-actuated gear-wheel intermeshing with a gear-wheel connected with the load, the said belt-actuated gear-wheel being so mounted as to permit it to perform, within limits of belt-tension, an epicyclic movement around the other said gear-wheel.

Thus in the rotation of the first or belt-driven gear-wheel the latter will tend to make its epicyclic movement around the other said gear-wheel with which it meshes, but such movement will be restrained by the belt when such has been tensioned and the continued rotation of the first wheel will then rotate the second wheel and so operate the machine. The degree of tension placed upon the belt will therefore depend upon the inertia to be overcome in starting the driven machine from rest and in the continued running thereof so that the belt will be properly tensioned to afford the necessary driving power under all circumstances.

In some cases however, such for example as in the event of a breakdown of the driven machine, it is desirable that the appliance shall cease to transmit motion to the load when the latter exceeds a predetermined maximum. Again in the driving of cream-separators and other machines possessing considerable inertia, it is desirable that such machines shall be permitted to over-run the driving power and thus avoid undue strains and shocks to such machines in cases where the driving power fails or becomes suddenly reduced in speed.

It is the object of the present invention to provide an improved appliance of the nature indicated wherein the power is transmitted from the belt to the load through the medium of a specially designed friction-clutch capable of being adjusted to slip and so interrupt the transmission when occasion requires, and wherein the belt will be operative upon the load in one direction only, thereby permitting the driven machine to over-run by its momentum the said transmission.

In order that the nature of the invention and its construction may be clearly understood, it will now be fully described and explained with reference to the accompanying sheet of drawings in which:—

Fig. 1.— is a perspective view of an appliance constructed in accordance with the present invention.

Fig. 2.— is a longitudinal section of the same upon a somewhat larger scale, and, Fig. 3.— is a longitudinal section through a friction-clutch and pulley illustrating a modified construction for that of Fig. 2.

As here shown 1 is a gear-wheel mounted upon a sleeve or hollow shaft 2 and which latter is adapted to receive or be connected to the shaft of the machine to be driven and to be keyed or otherwise drivably connected therewith, as by means of a set-screw 3 tapped through the boss of the gear-wheel and through the sleeve so as to engage the shaft within the latter.

Intermeshing with the gear-wheel 1 is a pinion 4 mounted upon a spindle 5 which latter is carried in a frame 6 rotatably mounted upon the sleeve 2 so as to be capable of rotating or swinging freely thereon. The said frame 6 preferably includes a suitable enclosing guard for the gear-wheel 1 and pinion 4, as here shown.

Mounted upon the spindle 5 are a pair of dies or cheeks 7 and 8 which are spaced at an interval apart and are inter-connected so as to rotate together by means of a sleeve 9. The said cheeks are mounted to be rotatable independently of the pinion 4 but are provided with a ratchet pawl 10 adapted to drivably engage such pinion in one direction only.

Mounted between the said cheeks 7 and 8 so as to be capable of rotating independently thereof is a pulley 11 to which driving power from a suitable external source is applied by means of a belt 12. Frictional engagement between the said pulley and cheeks is provided by means of a series of frictional elements or buttons 13 of leather or other resilient friction-giving material.

In the preferred form of the construction as illustrated in Figs. 1 and 2, the cheek 8 is formed with an outwardly projecting axial boss 14 which is slidably and rotatably received within a bearing 15 provided in the frame 6. The said boss 14 is made hollow or formed with an axial bore within which is slidably but non-rotatably received the end of the sleeve 9 formed integral with or attached to the cheek 7. As here shown for the purpose of preventing rotation between the boss 14 and sleeve 9 the latter is provided with a feather 16 slidably received in a feather-way 17 in the boss.

The portion of the spindle 5 to one side of the pinion 4 is received and supported by the sleeve 9 while the other end of such spindle to the opposite side of the pinion 4 is carried by a centre-point 18 or other appropriate form of bearing carried in the frame and adapted to both support such spindle and maintain the latter against an axial thrust.

Formed through the pulley 11 and each extending parallel with the axis of the latter are a series of holes or bores 19 in the ends of which are slidably received the buttons 13, while interposed between each pair of such buttons in the interior of the bore, is a compression spring 20 tending to force such buttons outwards into frictional engagement with the opposed faces of the cheeks 7 and 8.

For the purpose of adjusting the compression of the springs 20 and so governing the said frictional engagement, there is tapped through the outer end of the bearing 15 an adjustment-screw 21 the inner end of which engages the boss 14, as by means of a ball 22 or other form of thrust-bearing, while the outer end is formed with a hand-wheel 23 or other means adapted to be grasped by the fingers for the purpose of turning the screw 21.

Suitable means are provided for retaining the screw 21 in place when the adjustment has been made and which means may conveniently consist as here shown, of a spring or detent 24 attached to the exterior of the bearing 15 and adapted to engage with any one of a series of notches 25 formed around the periphery of the hand-wheel 23.

Provision is made also for preventing movement of the cheek 7 towards the side of the frame 6 at which the pinion 4 is situated. As here shown this purpose is effected by securing the said pinion rigidly to the spindle 5 as by means of a pin 26 thus enabling the end of such pinion to serve as a shoulder against which the adjacent face of the cheek 7 is adapted to bear.

The arrangement is such that by slackening the adjustment screw 21 the cheek 8 will thereby be permitted under action of the springs 20 to recede from the cheek 7 thereby relieving the compression of such springs and so reducing the frictional engagement between such cheeks and the buttons 13, and similarly if the said screw is tightened the cheeks will be caused to approach one another and so by increasing the compression of the springs will increase the said frictional engagement.

In the operation the appliance is connected to the machine to be driven and power from a suitable source is applied by the belt 12 to the pulley. The screw 21 may be slackened sufficiently to reduce the frictional engagement to such an extent that the pulley will be permitted to revolve idly without actuating any of the other parts. If the screw is tightened however, to increase the frictional engagement to the necessary extent, the cheeks 7 and 8 will thereby be caused to revolve and by the engagement of their pawl 10 will cause the pinion 4 to revolve also. The pinion, upon commencing its rotation, will make a partial epicyclic movement around the gear-wheel 1 with which it meshes but, upon the belt becoming tightened, such epicyclic movement will cease and the continued rotation of the pinion will serve to rotate the gear wheel in the ordinary manner, thus driving the machine. In response to increases and decreases in the load the pinion will make similar partial epicyclic movements in one direction or the other thereby adjusting the belt tension to suit requirements for the time being.

In the event of the load increasing to an extent beyond that predetermined by the operator in adjusting the setting of the screw 21, the pressure between the cheeks 7 and 8 and the buttons 13 will be insufficient to enable the latter to maintain their engagement and will consequently slip round in contact with the faces of such cheeks without rotating the latter.

Owing to the fact that the adjustment-screw 21 is tapped into the boss 14, it will be understood that such screw will be stationary with the frame thereby enabling its wheel or head 23 to be conveniently grasped and turned for the purpose of effecting the said adjustment when the moving parts of the device are in motion.

In cases where the driven machine consists of a cream-separator or other machine which when in operation attains considerable momentum, a sudden stoppage or slowing down of the power transmitted by the belt will cause the gear-wheel 1 to rotate the pinion 4, but the latter, being connected to the cheeks solely by means of the pawl 10, will rotate idly without restraint from such cheeks, thus avoiding the strain and shock that would otherwise be thrown upon the driven machine and the driving mechanism by a sudden checking of the momentum.

Referring now to the modification of the clutch and pulley shown in Fig. 3, the construction in this case differs from that already described in that the buttons 13 and their compression springs 20 are mounted in bores 26 formed in the cheeks 7 and 8 so that such buttons will make their frictional engagement with the two lateral faces of the pulley. As here shown also the sleeve 9 is arranged to rigidly connect the said cheeks so as to cause them to rotate together and to maintain then permanently at a fixed distance apart, the compressional adjustment of the springs 20 being in this case effected by means of screws 27 tapped into the outer face of the cheek 8 so as to engage the springs contained in the bores 26 of such cheek.

In this case the screw 21 will be eliminated and the bearing 15 will be made to simply receive the end of the spindle 5.

In operation this modification will be generally similar to that already described but the construction possesses the disadvantage that the adjustment of the screws 27 can only be effected when the cheeks are at rest.

If so desired. however, the construction shown in Fig. 3 may be modified by constructing the frame identically with that of Figs. 1 and 2 and providing the cheek 8 with a boss as 14 adapted to slidably but non-rotatably receive the sleeve 9 arranged as in the form shown in Fig. 2.

In this case the manipulation involved in effecting the adjustment of the frictional pressure will be effected by means of the adjustment-screw 21 in the manner already explained.

I claim:—

1. A power transmitting clutch, comprising, in combination, a driven member, a pair of rotatable clutch members spaced apart and slidable toward and from each other, means between said clutch members and said driven member for rotating the latter with the clutch members only in one direction, a driving pulley mounted for rotation between said clutch members, a plurality of flexible members carried by said pulley in frictional engagement with the clutch members thereby to cause the latter to rotate with the pulley, and means for regulating the distance between said clutch members thereby to adjust the tension of said flexible members.

2. A power transmitting clutch, comprising, in combination, a spindle mounted for rotation, a driven member secured to said spindle, a pair of clutch members mounted for rotation on said spindle in spaced relation to each other and one slidable toward the other, a pulley mounted for rotation on said spindle between said clutch members, flexible means carried by said pulley for frictionally engaging said clutch members, means for adjusting the tension of said flexible means, and cooperating means carried by said clutch members and driven member for rotating the latter with the clutch members only in one direction.

3. A power transmitting clutch, comprising, in combination, a spindle mounted for rotation, a driven member secured to said rotation, a driven member secured to said spindle adjacent to one end thereof, a clutch disk mounted for rotation on said spindle in abutting relation to said driven member, said disk having an elongated sleeve enclosing the end of the spindle opposite from said driven member, a second disk having a tubular elongated boss mounted on said sleeve for slidable movement toward and from said first disk, a driving pulley mounted for rotation on said sleeve between said clutch disks, a plurality of flexible members carried by said pulley in frictional engagement with the clutch disks, means for regulating the distance between the disks thereby to adjust the tension of said flexible members, and cooperating means carried by said first clutch disk and said driven member for rotating the latter with said clutch disk only in one direction.

4. A power transmitting clutch, comprising, in combination, a spindle mounted for rotation, a driven member secured to said spindle adjacent to one end thereof, a clutch disk mounted for rotation on said spindle in abutting relation to said driven member, said disk having an elongated sleeve enclosing the end of the spindle opposite from said driven member, a second disk having a tubular elongated boss mounted on said sleeve for slidable movement toward and from said first disk, a driving pulley mounted for rotation on said sleeve between said clutch disks, a plurality of flexible members carried by said pulley in frictional engagement with the clutch disks, a manually operable screw engaging said boss for regulating the distance between the disks thereby to adjust the tension of said flexible members, and cooperating means carried by said first clutch disk and said driven member for rotating the latter with said clutch disk only in one direction.

In testimony whereof I have signed my name to this specification.

JAMES STUART WEARN.